(No Model.)
H. B. SAWYER.
TROLLEY WHEEL.
No. 597,693. Patented Jan. 18, 1898.
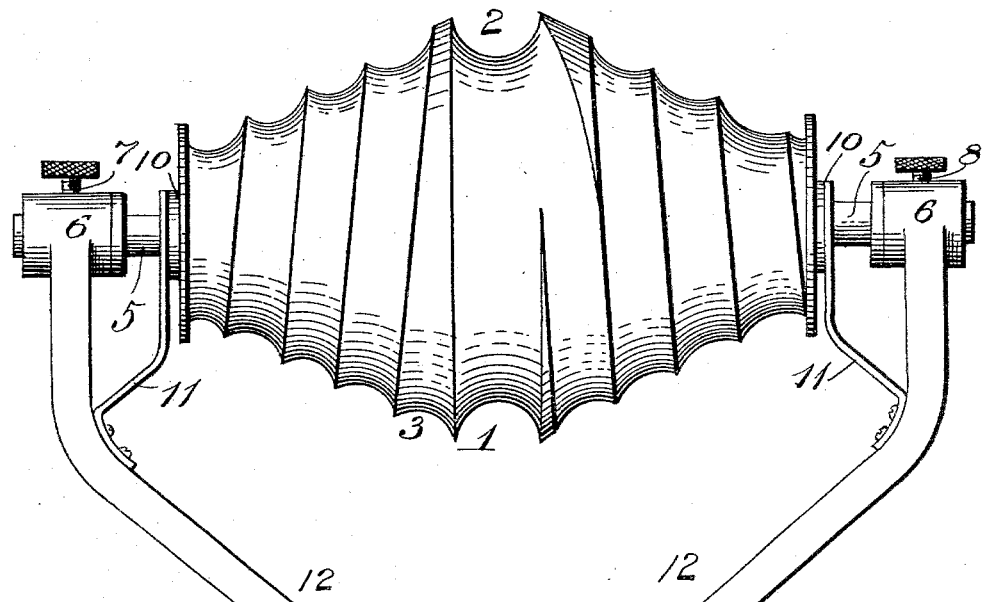
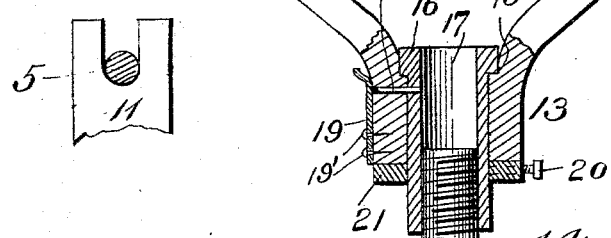
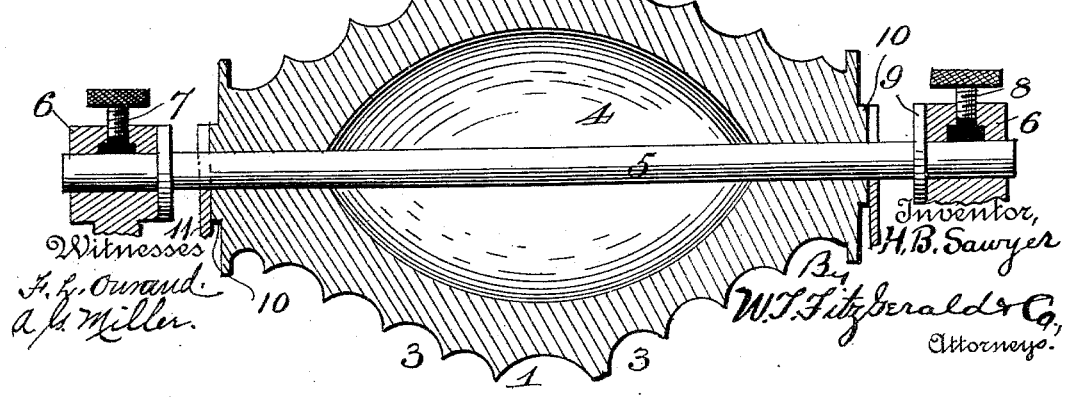

United States Patent Office.

HARRY BERT SAWYER, OF CHICAGO, ILLINOIS, ASSIGNOR OF ONE-HALF TO MEYER WHEELER, OF SAME PLACE.

TROLLEY-WHEEL.

SPECIFICATION forming part of Letters Patent No. 597,693, dated January 18, 1898.

Application filed June 19, 1897. Serial No. 641,529. (No model.)

*To all whom it may concern:*

Be it known that I, HARRY BERT SAWYER, a citizen of the United States, residing at Chicago, in the county of Cook and State of Illinois, have invented certain new and useful Improvements in Trolley-Wheels; and I do hereby declare the following to be a full, clear, and exact description of the invention, such as will enable others skilled in the art to which it appertains to make and use the same.

My invention, as will be hereinafter fully described and claimed, relates to trolley-wheels, and more particularly to means for constructing and mounting the wheel in its operative position, the object being to provide against the casual disconnection of the wire from the wheel and thereby interrupt the flow of the electric current to the motor, and, further, to so mount the wheel in position that its bearings will be completely isolated from the electric current, thus rendering it impossible that the lubricant employed shall be burned or destroyed by the current.

In the accompanying drawings, Figure 1 is a rear view of my improved trolley-wheel mounted in a suitable bracket upon the end of the trolley-pole. Fig. 2 is a longitudinal central section of the wheel and bearings. Fig. 3 is a section of Fig. 2 on a line between the spring and the grooved wheel.

Briefly stated, my invention consists in providing a central groove or pulley having integrally formed therewith lateral extensions, the surface of which is provided with an inwardly-directed spiral groove having connection with the central groove or pulley and designed to guide or direct the wire back into said pulley in case the latter is casually or otherwise removed therefrom.

Referring in detail to the several parts of my invention, 1 represents my improved trolley-wheel, which in outline somewhat resembles two cones joined at their base. Centrally disposed upon the body thus provided is the groove 2, designed to supplant the usual pulley-wheel for connecting with the electric wire. Each of the conical ends of the body is provided with the spirally-disposed groove 3, extending from the extreme ends to the central groove 2, into which they gradually merge. Said spiral grooves 3 are so formed and directed upon the body that they will feed into the central groove, and thus deliver the wire should it become displaced from the main groove and fall into one of the lateral grooves. It is thought that this function will be readily apparent, and it is therefore deemed unnecessary to elaborate thereon. The body thus constructed is preferably formed of any cast metal, though it will be understood that any suitable material may be employed for the purpose, and to insure the requisite degree of lightness a hollow central chamber 4 may be provided. The body thus or otherwise constructed is provided with the axle or shaft 5, to which it is permanently attached by being shrunk thereon or otherwise.

The extreme ends of the shaft 5 are received by the bearings 6, which are provided with the lubricant-chambers 7, provided with the compression or feeding valves 8. In order to hold the shaft 5 against lateral movement, though permit its free rotation, I provide the guide-disks 9, which are shrunk upon the shafts at this point, thus insuring a permanent union between these parts.

Upon the extreme ends of the spirally-grooved body 1 I provide the shoulders 10, integrally formed with the body and designed to engage directly with the switch-springs 11, the lower ends of which are in permanent union with the arms 12, integrally or otherwise attached to the socket 13, affording means for uniting these parts to the trolley-pole 14.

The upper ends of the springs 11 may for cheap construction be bifurcated or slotted, said bifurcation or slot being designed to directly receive the shaft 5, the spring thus mounted being held against lateral displacement. Said springs are so shaped that the tension thereof will be directed firmly against the shoulder 10, thus insuring a perfect electrical union of the parts and providing that the current will flow through said springs into the arms 12 and thence to the usual pole 14. By this arrangement it will be seen that the bearings, with their respective oil-cups, are short-circuited or completely isolated from the current, thus insuring against the destruction of the lubricant, a very valuable desideratum.

While I have described the preferred construction and accessories deemed necessary to materialize my invention, it will of course be understood that the equivalent thereof is comprehended by me, and I do not wish, therefore, to be confined strictly to the showing I have made.

I form in the tubular socket 13 the annular shoulder 15, designed to receive the head 16 of the sleeve 17, which is held against rotation by the stop 18, normally held inward by the spring 19, properly secured to the tubular socket by the screws 19'.

Preferably at the point indicated in Fig. 1 I secure, by means of the set-screw 20, upon the sleeve 17 the collar 21, designed to prevent a downward movement of the socket 13 upon said sleeve, while the head 16 thereof will prevent upward movement and incident casual displacement.

By the construction just described it will be apparent that the bracket formed by the arm 12 and the socket 13 may be readily removed from the trolley-pole 14 when for any reason it is desirable to do so.

Having thus fully described my invention, what I claim as new, and desire to secure by Letters Patent, is—

1. The herein-described removable bracket for trolley-poles consisting of the arms 12 secured to the socket 13 in combination with a sleeve designed to be attached to the trolley-pole and having upon its upper end an annular collar and having secured near its lower end an adjustable collar in combination with a withdrawable spring-controlled stop-pin, all operatively combined in the manner and for the purpose set forth.

2. The herein-described trolley-wheel consisting of the elongated hollow body having centrally and inwardly directed end grooves and further provided with the integrally-formed shoulder upon the extreme ends of said body; a shaft permanently attached to said body and having a collar attached near each end thereof; suitable bearings for the extreme ends of said shaft and switch-springs having a slotted parallel end designed to receive said shaft and lie in close contact with the ends of the body, the lower ends of said springs being connected with the supports for said bearings; a collar connecting the lower ends of said supports; an internally-threaded sleeve mounted on the upper end of the trolley-pole and passing loosely through the bore provided in said collar, and suitable means for holding said collar against rotating on said sleeve, as and for the purpose set forth.

In testimony whereof I affix my signature in presence of two witnesses.

HARRY BERT SAWYER.

Witnesses:
JNO. C. WEBB,
A. R. JONES.